Jan. 25, 1966 W. UGARTECHEA 3,231,688
TELEPHONE HANDSET EARPIECE
Filed Oct. 29, 1962 2 Sheets-Sheet 1

WILLIAM UGARTECHEA
INVENTOR.
BY
Nilsson & Robbins
ATTORNEYS.

TELEPHONE HANDSET EARPIECE

Filed Oct. 29, 1962 2 Sheets-Sheet 2

WILLIAM UGARTECHEA
INVENTOR.

BY Nilsson & Robbins
ATTORNEYS.

United States Patent Office 3,231,688

Patented Jan. 25, 1966

3,231,688
TELEPHONE HANDSET EARPIECE

William Ugartechea, 4062 E. Daines Drive, Arcadia, Calif.

Filed Oct. 29, 1962, Ser. No. 233,578
12 Claims. (Cl. 179—182)

This invention relates to handsets for communication instruments, and more particularly to an improved receiver earphone portion thereof which permits more comfortable and efficient use of the instrument.

The earphone or receiver portions of conventional handsets for radio transceivers, radio telephones and particularly for the various types of the widely used telephone, have been developed to press firmly and rather comfortably against the ear of the user. The portion contacting the user's ear is normally an angularly symmetric, annular rim which has smooth outer surfaces and which secures the receiver transducer within the handset body. For the normal and unadorned ear, an adequately acoustically tight matching may be comfortably achieved between the smooth rim and the pliable ear of the user. However, a very large proportion of modern telephone users are women for whom minimal jewelry while working, or otherwise using the telephone, consists of earrings. Other users have hearing aids or other hardware affixed to at least one of their ears. To achieve the required acoustical connection between the receiver and the ear while at the same time eliminating extraneous noises, requires an appreciable magnitude of discomfort to the tender ear or, alternatively, requires the highly inconvenient removal of the hearing aid or earring.

Other attempts to solve this problem have typically been directed toward simply removing a portion of the annular rim on the receiver. However, it is not usually possible to remove enough material to avoid uncomfortable pressure on an earring and equally importantly, the opening so provided permits the intrusion of extraneous noise into the ear.

It is therefore an object of the present invention to provide a handset and earphone which is not subject to these and other disadvantages of the prior art.

It is another object to provide a receiver earphone which provides, with comfort, unobstructed acoustical connection between the receiver transducer diaphragm and the ear of the user, and which additionally permits the user to have earrings, hearing aids or other hardware affixed to the ear.

It is another object to provide such a handset receiver which effectively isolates the ear of the user from extraneous noises.

It is another object to provide for use with a conventional telephone handset earphone a low cost removable attachment which permits effective, comfortable, extended use of the telephone by a user wearing earrings or hearing aid devices in or on the ear.

It is another object to provide such attachment which may at any time be used with equal advantages at either the left or the right ear of the user.

It is another object to provide such an attachment which is an aid to urging aside and holding away from the telephone receiver the coiffure of the user.

It is another object to provide such attachment which directs and focuses sounds from the receiver into the auditory canal of the ear of the user.

Briefly, these and other objects are achieved in accordance with one embodiment of the present invention by providing a molded extending attachment for the receiver cap of a conventional telephone handset. The attachment includes a short cylindrical body portion which fits snugly over the receiver cap or rim. A curved, audially directing portion extends axially from one sector of the cylindrical portion away from the receiver and is adapted and shaped to form an open or foraminated end which may comfortably be urged against the helix-anthelix portion of the ear of the user. This audially directing portion defines a generally tubular structure which acoustically communicates and funnels audio signals from the receiver diaphragm to the auditory canal and inner ear of the user. The remainder of the body portion forms a curved surface which is closed over the remaining sector of the cylindrical portion. The angle of the sector of the tubular portion may be approximately 120 degrees or one third that of the total cylindrical portion.

The novel features and their operation as well as additional objects and advantages will become apparent and be best understood from a consideration of the following description taken in connection with the accompanying drawing, in which.

Referring to the figures in more detail, it is stressed that the details shown are by way of example only and are presented in the cause of providing what is believed to be the most useful and readily understood description of the invention. The detailed showing is not to be taken as a limitation upon the scope of the invention which is to be measured by the appended claims forming a part of this specification.

Figure 1:
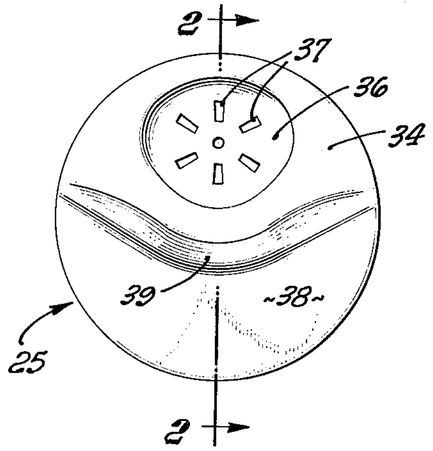
FIG. 1 is a plan view of a presently preferred example of a telephone receiver attachment constructed in accordance with the principle of the present invention.
Figure 2:
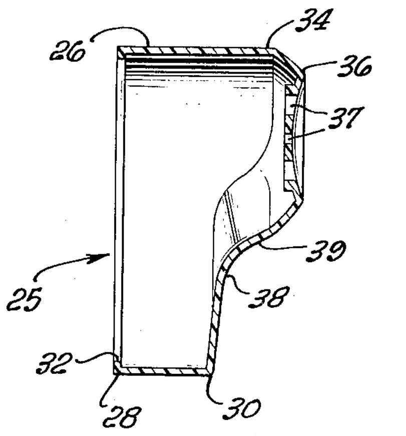
FIG. 2 is a sectional view of the structure shown in FIG. 1 taken along the lines 2—2 thereof.
Figure 3:
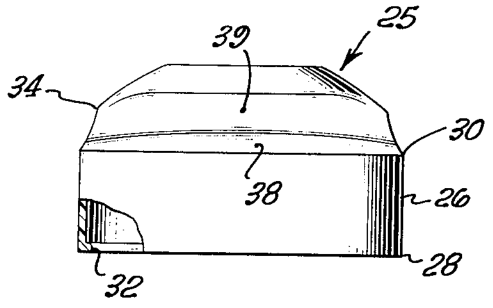
FIG. 3 is a frontal elevational view of the structure of FIG. 1.

In FIG. 1, FIG. 2, and FIG. 3, an example of the invention in the form of a readily removable, snap-on attachment 25 is illustrated. At present this embodiment is considered to be particularly adapted to achieve the objects and exhibit the advantages of the invention. In addition, the relatively simpler structural features of this example lend themselves to a relatively brief description and discussion. Other embodiments and combinations and environmental details will be presented separately in connection with the subsequent figures.

The attachment 25 is preferably molded in one piece from polyethylene or propylethylene or other durable, semi-flexible plastic materials. The wall thickness can be substantially uniform and is preferably of the order of .080 inch.

The body of the attachment includes a short cylindrical portion 26 having an open end 28 and a substantially closed end 30. A radially inwardly extending bead 32 may be formed inside the end 28 and may extend about the entire periphery of the cylindrical portion, as shown, or may consist of a plurality of tangentially short bead segments. The function of the bead 32 is to retain with angular freedom for adjustment the attachment 25 over the receiver retaining cap of a conventional telephone handset (see the later figures). The bead may be snapped into the usual annular channel formed around the base of the receiver cap where it joins the handset. To that end, in this example, the inner diameter of the attachment 25 is made approximately equal to the outer diameter of the receiver cap.

A tubular portion 34 protrudes axially beyond the end 30 of the cylindrical portion 26 and is terminated in a contoured end member 36 which is shaped and dimensioned to fit comfortably against the outer ear of the user. The tubular portion 34 has an inner width which is considerably reduced with respect to that of the cylindrical portion 26 and is adapted, as is apparent from the figure, to direct and funnel audio signals from the cylindrical portion 26 into the tubular portion 34 toward the end member 36. The end member may be foraminated with an array 37 of small openings or may be more substantially relieved as suggested in the subsequent figures. In this example the end member 36 is contoured concavely in its central portion to provide greater comfort and an improved acoustical matching between the tubular portion 34 and the ear of the user.

It may be noted that, in plan, the tubular portion 34 is generally sector shaped having an apex near the axis of the cylindrical portion 26 and subtending an arc along a portion of the cylindrical surface thereof of approximately 120 degrees. This small arcuate dimension of the raised or protruding portion of the attachment provides considerable versatility of use regarding different users, left or right ear, and a wide range of different earrings or other hardware affixed to the ear.

The remainder of the end 30 is closed by a contoured surface 38 which cooperates with the outer surface 39 of the tubular portion 34 to define a region isolated from the internal acoustical channel and within which the ear lobe and an earring may be comfortably disposed without permitting extraneous noise to enter the acoustical channel.

Figure 4:
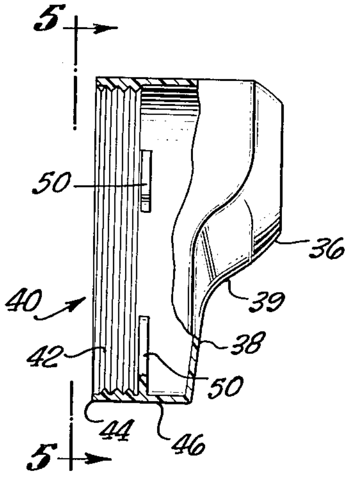
FIG. 4 is a partially sectional, partially side elevational view of an alternative example of the present invention.
Figure 5:
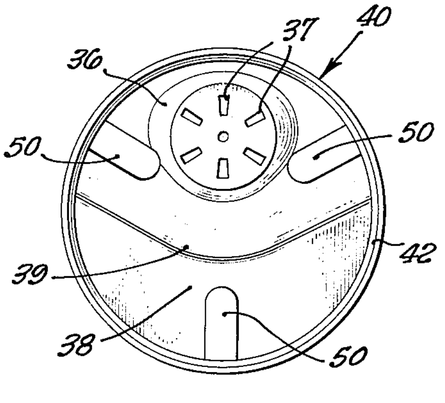
FIG. 5 is a bottom view of the structure shown in FIG. 4.

Referring to FIG. 4 and FIG. 5, an example of the invention is illustrated which is similar in most respects to that of the previous figures except that an attachment 40 is shown which replaces the conventional receiver retaining cap. The attachment 40 is held securely onto the handset by a set of threads 42 which are formed inside the end 44 of a short cylindrical portion 46 the opposite end of which may be formed substantially as indicated above in connection with the structure shown in the previous figures. To this end, the same reference numerals have been applied to the present figures even though the structure may in a physical embodiment be somewhat different. For example, the inner diameter of the attachment 25 may be slightly more than that of the attachment 40 because the former fits over the retaining cap while the latter replaces it and has a lesser outer diameter in order to conform with that of the remainder of the receiver portion of the handset.

The threads 42 may be molded or machined into the cylindrical portion 46 to match those of the receiver to which the attachment 40 is to be affixed. When the conventional cap is removed and the attachment 40 affixed to the handset receiver, a set of radially inwardly extending retaining members 50 molded integrally with the body of the attachment 40 engage the loose receiver portions and retain them securely within the body of the handset. The retaining members 50 may take many forms alternative to that shown; for example, a portion of the contoured surface 38 may be utilized as at least a part of the retaining means. In addition, means in the form of a separate, non-integrally formed member, not shown, may be inserted within the attachment for compressively retaining the receiver portions into the handset body.

In the remaining figures, a detailed alternative embodiment of the invention is illustrated; and the environment and use of the invention as well as its combination in an otherwise conventional telephone handset is shown.

Figures 6, 7, 8, 9, 10:
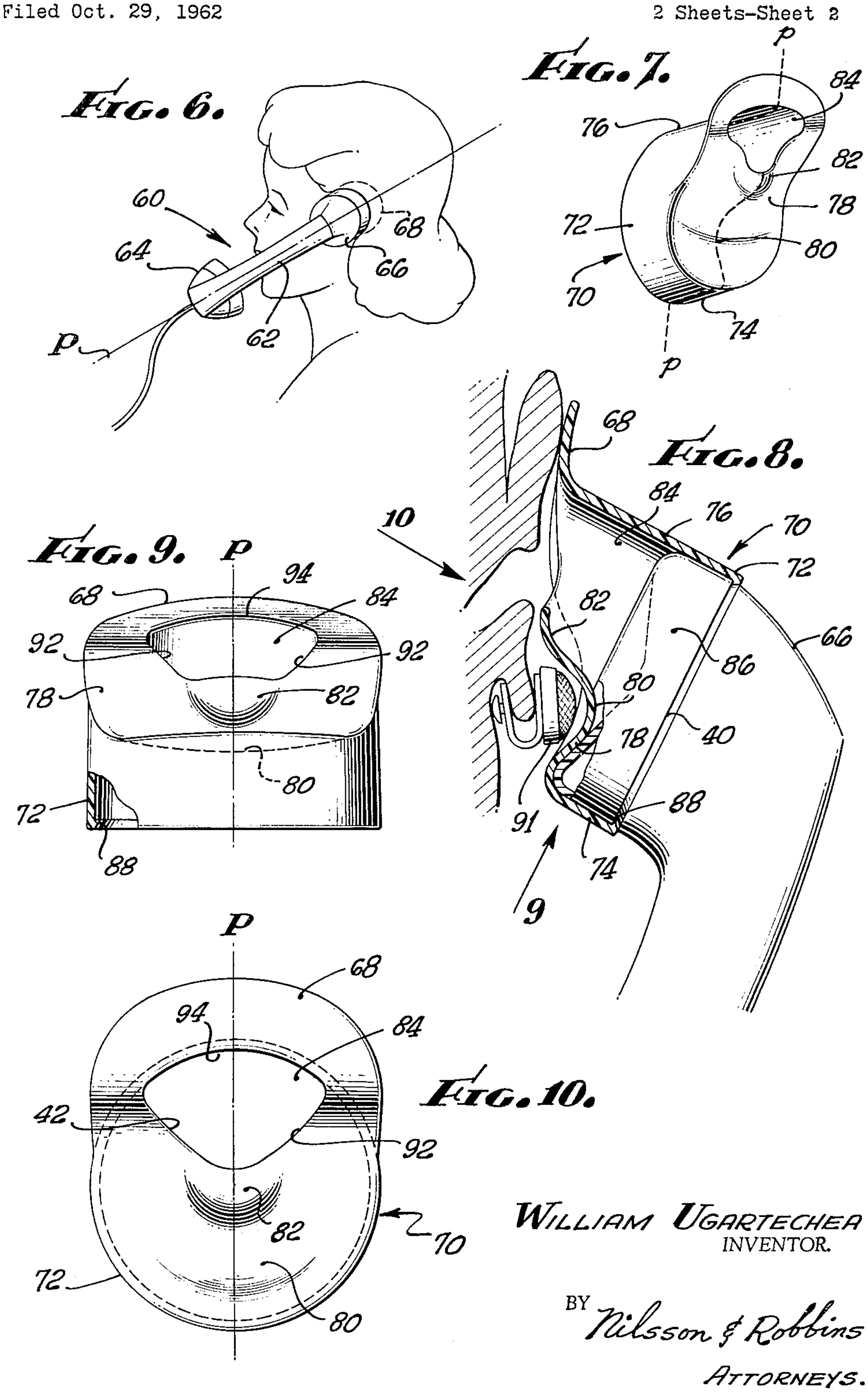
FIG. 6 is a pictorial view of a telephone handset constructed in accordance with another example of the present invention.
FIG. 7 is a perspective view of the example of an earphone attachment constructed in accordance with the present invention.
FIG. 8 is a partially sectioned view of the handset receiver shown in FIG. 7.
FIG. 9 is an elevational view of the device of FIG. 8 taken along the direction of the arrow 9 thereof.
FIG. 10 is a plan view of the device of FIG. 8 taken along the direction of the arrow 10 thereof.

In FIG. 6 there is shown a handset 60 in use position by a female user. The handset includes a hand portion 62, a transmitter mouthpiece portion 64, and an earphone receiver portion 66. An extending flange portion 68 is shown in this example pressed against an external ear of the user, and the figure illustrates the function of the curved lip of the extending flange portion 68, discussed in more detail below, in urging aside and holding away the coiffure of the user from the space between the earphone portion 66 and the ear of the user. The handset 60 including its hand portion 62, mouthpiece portion 64, earphone portion 66, and flange portion 68 is disposed substantially symmetrically about a longitudinal plane P, which is longitudinal with respect to the length of the handset 60 and which is perpendicular to the plane of the drawing. Thus the handset 60 is equally adaptable for use with either the left or the right ear of the user.

Referring to FIG. 7, a telephone receiver attachment 70 is shown in perspective as an integral unit disassociated from the remainder of the telephone receiver. The attachment 70 includes an axially short cylindrical body 72 which has a cylindrical side portion 74 extending approximately 180 degrees around the cylindrical body 72. The cylindrical side portion 74 is symmetrically disposed about the line P—P which represents the intersection of the attachment 70 with the plane P shown in FIG. 6. The cylindrical body 72 includes a second cylindrical side portion 76 which extends axially further to the right in the figure than does the side portion 74. The side portion 76 is longest along the line P—P.

The cylindrical body 72 is partially occluded at its right hand end in the figure by a curved surface 78 which in this example forms a depression 80 which is contoured concavely into chamber defined by the cylindrical body 72 and the curved surface 78. Contiguously to the depression 80 the curved surface 78 forms a contoured protuberance 82 which projects outwardly and is dimensioned to press against the lower forward edge of the opening in the user's outer ear. The wall of the protuberance 82 adjacent to the depression 80, in cooperation with the cylindrical side portion 76, forms a tubular auditory channel 84 which communicates between the auditory canal of the user's ear and the receiver transducer of the telephone handset. When the attachment 70 is in use, the tubular auditory channel 84 directs and focuses the sound from the receiver transducer into the opening of the ear of the user; and at the same time the protuberance 82 precludes the introduction of extraneous noise into the auditory channel of the ear of the user. This feature of the attachment as well as the depression 80 will be discussed and described further in connection with the description of FIG. 8 below.

The curved surface 78 extends from the periphery of the cylindrical side portion 74 to the periphery of the side portion 76 and passes therebeyond to form the extending flange portion 68. The flange 68 extends about and is substantially concentric with a portion of the periphery of the cylindrical side portion 76 where the concentric portion may subtend approximately 90 degrees to 120 degrees of the arc of the cylindrical side portion 76. The extending flange portion 68 is shaped and dimensioned to fit comfortably against the helix-anthelix portion of the user's ear.

Referring to FIG. 8, a section taken along the line P—P or the lines 8—8 of FIG. 6 is shown against the ear of the user also indicated in section. The inner diameter of the cylindrical body 72 is approximately equal to the outer diameter of the receiver rim 86, over which it is shown to be snugly impressed. About the periphery of the right hand end of the cylindrical body 72 is an inwardly extending, radially slight ridge 88 which is adapted to be impressed into the annular channel 90 between the rim 86 and the remainder of the receiver earphone portion 66. The attachment 70 is preferably made of a semi-rigid plastic material, such as polyethylene and thus is firmly yet removably attached to the receiver earphone portion of the handset 60. Such a semi-rigid material is also preferable with respect to the advantage of providing comfort to the user since such a material readily exhibits a satisfactory smoothness and compliance with the shape of the user's ear.

The protuberance 82 is shown to extend toward the lower and forward edge of the auditory canal of the ear of the user. The communication of the tubular auditory channel 84 between the receiver earphone and the auditory canal of the ear of the user is clearly illustrated in the figure by the shape of the walls of the channel 84 which are formed by the protuberance 82 and the cylindrical side portion 76 of the cylindrical body 72. It is also clear that while the channel 84 directs and focuses the sound from the receiver into the auditory canal of the ear, it also precludes the introduction into the channel or the auditory canal of extraneous noises, particularly from the direction of the transmitter mouthpiece 64. Thus any deleterious or annoying regenerative feedback between the receiver and transmitter portions of the communication system is avoided. The depression 80 in the curved surface 78 is shown accommodating an earring 90 affixed to the lobe of the ear of the user. Thus effective auditory communication may be achieved between the receiver and the ear while excluding extraneous noises and at the same time accommodating comfortably an earring or other hardware affixed to the ear of the user.

Referring to FIGS. 9 and 10, the symmetry of the attachment 70 about the plane P is illustrated in the respective elevational and plan presentations. The curved surface 78 with its depression 80, protuberance 82, and extending flange portion 68 and their relationship to the cylindrical body 72 are shown. The tubular auditory channel 84 is shown to terminate, in this example, in a sector-like opening in the surface 78. The opening has a pair of side segments 92, the extensions of which would intersect near the axis of the cylindrical body 72. The angle between the segments 92 is approximately in the range of 90 degrees to 120 degrees. The arc portion 94 of the sector-like opening is of like angle and lies contiguously along the intersection of the cylindrical body 72 with the curved surface 78.

There has thus been disclosed and described a receiver handset and attachment which achieves the objects enumerated above and which has among its several advantages those set forth and described above.

What is claimed is:

1. A molded plastic attachment for a telephone handset having a short cylindrical receiver portion and a threaded receiver retaining cap applied thereover, the attachment comprising: a short, hollow cylindrical body portion having first and second ends and having an inner diameter equal at least to approximately the outer diameter of said cylindrical receiver portion; a short, tubular protuberance portion extending axially outwardly from said cylindrical body portion and partially occluding said first end thereof, said protuberance defining with said cylindrical portion a continuous auditory channel funneling respectively from a larger to a smaller channel cross section; and end portion for terminating the end of said protuberance opposite from said cylindrical portion and being smoothly formed with said protuberance to fit comfortably against the outer ear of a user, said end portion being partially open to define an acoustical coupling between said receiver portion and the inner ear of said user; and a non-protruding closure portion affixed over said first end of said cylindrical portion for joining with structural continuity the walls of said cylindrical portion to those of said tubular protuberance, the external surfaces of said protuberance portion and said non-protruding closure portion thereby defining an acoustically isolated clearance region about the lobe of the ear of the user.

2. The invention according to claim 1 in which said end portion is an inwardly protruding foraminated structure smoothly joined about its periphery to said protuberance portion.

3. The invention according to claim 1 in which said protuberance portion in axial, plan view defines a sector-like portion of the circular outline of said cylindrical portion.

4. The invention according to claim 3 in which said sector-like portion subtends an arc of said circular outline of the order of 120 degrees.

5. The invention according to claim 3 in which said second end of said short cylindrical portion includes a radially inwardly projecting retaining ridge extending about at least a portion of the periphery of said cylindrical portion.

6. The invention according to claim 3 in which the inner cylindrical surface of said second end is threaded and in which said attachment defines a complete replacement for said threaded receiver retaining cap.

7. The invention according to claim 6 in which further includes radially inwardly projecting means affixed to the inner cylindrical surface of said cylindrical portion for retaining said receiver within said handset.

8. An attachment member for a telephone handset receiver comprising a molded body portion having an open tubular first end for securingly attaching said member over the end of said receiver and having a second end comprising a protruding, axially directed portion extending away from said first end and adapted to contact the upper and rearward ear portion of the user; a short tubular horn portion disposed within said body portion and extending from the diaphragm of said receiver along said axially directed portion and communicating acoustically between said diaphragm and the ear of the user, the remainder of said second end being a closed three-dimensional surface cooperating with the external surface of said horn portion to define a region comfortably isolated from said receiver for other hardware affixed to the ear of the user.

9. A capping member for a telephone handset receiver comprising a molded body portion having an open, threaded, cylindrical first end for securingly attaching said member over the matchingly threaded end of said receiver and having a second end comprising an acoustically directing tubular portion extending away from said first end and adapted to contact the upper and rearward ear portion of the user and defining a horn extending and communicating acoustically from the diaphragm of said receiver to the ear of the user, the remainder of said second end being a closed three-dimensional surface having a portion which cooperates with said tubular portion to define a region for comfortably isolating said receiver from other hardware affixed to the ear of the user while channeling audio signals from said receiver to the inner ear of the user.

10. In a telephone handset of the character including a central handle portion with a transmitter mouthpiece disposed at one end and a receiver earphone at the other, the handset being substantially symmetrically disposed about a longitudinal plane, the earphone being terminated with a transducer diaphragm and an annular rim having an axis lying in said longitudinal plane, said annular rim and said earphone forming an intended annular channel along the juncture of their outer surfaces, an attachment molded of a semi-rigid plastic material to permit comfortable, prolonged and repeated use of the handset while the user has other hardware affixed to the ear, the attachment comprising: a short thin-walled cylindrical body having an inner diameter approximately equal to the outer diameter of said annular rim and having a radially slight, inwardly protruding annular bead disposed about the periphery of one end of said cylindrical body adapted to engage said indented annular channel to secure removably the attachment to said earphone; a curved surface wall partially occluding the opposite end of said cylindrical body, said cylindrical body having first and second oppositely disposed wall portions, said first wall portion comprising a first approximately one-half of the circumference of said cylindrical body, said second wall portion extending axially beyond said first wall portion, said curved surface wall extending from said first wall to said second wall to form with said second wall a tubular protuberance contoured to extend toward the front and lower edge of the opening in the external ear of the user and having a partially closed end which is contoured to fit against the helix-anthelix region of the ear of the user, said curved surface wall including a contoured portion for accommodating other hardware affixed to the ear of the user, said curved surface wall including a protuberance the inner surface of said second cylindrical wall portion and said protuberance forming thereby a tubular open channel for discriminatory auditory communication between said receiver transducer and the auditory canal of the ear of the user the cross section of said tubular protuberance being generally sector-shaped with the apex of the sector disposed near the axis of said cylindrical body, the magnitude of said arc being in the range of 90 degrees to 120 degrees.

11. An attachment for the receiver portion of a telephone handset of the character which includes an annular rim and cap for retaining the transducer of the receiver and which provides an annular indentation around the outer surface of the receiver portion between said rim and the remainder of said receiver portion, said rim and cap being a figure of revolution about an axis lying in a plane of symmetry longitudinally disposed through said handset, the central portion of said cap being acoustically apertured and depressed toward said transducer, said attachment comprising: a short cylindrical body of molded plastic dimensioned to fit snugly over said rim and terminated at one end by a radially inwardly extending bead adapted to engage removably for support said annular indentation, said cylindrical body being symmetrically disposed with respect to an axial plane and having a first shorter wall portion and an appositely, disposed second longer wall portion, a curved, end wall portion partially occluding said cylindrical body at its end opposite from said bead, said end wall portion extending from said first shorter portion and including a depression adapted to follow contiguously, in part, the depressed central portion of said cap and further including an apertured extension adapted to project away from said transducer toward the opening in the outer ear of the user and further including a flange portion extending radially and axially beyond the end of said second longer wall portion to form a flattened surface adapted to be pressed comfortably against the helix-anthelix portion of the ear of the user; said curved end wall also being symmetrically disposed about said axial plane, said depression having dimensions to accommodate comfortably hardware affixed to the ear of the user, said apertured extension forming a tubular acoustical channel from said transducer to the auditory canal of the ear of the user while discriminating against the intrusion therein of extraneous noises.

12. In a telephone handset of the character including a central handle portion with a transmitter mouthpiece disposed at one end and a receiver earphone at the other, the handset being substantially symmetrically disposed about a longitudinal plane, the earphone being terminated with a transducer diaphragm and an annular rim having an axis lying in said longitudinal plane, said annular rim and said earphone forming an indented annular channel along the juncture of their outer surfaces, an attachment molded of a semi-rigid plastic material to permit comfortable, prolonged and repeated use of the handset while the user has other hardware affixed to the ear, the attachment comprising: a short thin-walled cylindrical body having an inner diameter approximately equal to the outer diameter of said annular rim and having a radially slight, inwardly protruding annular bead disposed about the periphery of one end of said cylindrical body adapted to engage said indented annular channel to removably secure the attachment to said earphone; a curved surface wall partially occluding the opposite end of said cylindrical body, said cylindrical body having first and second oppositely disposed wall portions, said first wall portion comprising a first approximately one-half of the circumference of said cylindrical body, said second wall portion extending axially approximately twice the length of said first wall portion, said curved surface wall extending from said first wall to said second wall and therebeyond to form a flange extending circumferentially about a second approximately one-half of said cylindrical body and contoured to fit against the helix-anthelix region of the ear of the user, said curved surface wall including a concavely contoured portion depressing into the chamber defined by said cylindrical body and said curved surface wall for accommodating other hardware affixed to the ear of the user, said curved surface wall including a protuberance contoured to extend toward the front and lower edge of the opening in the internal ear of the user, the inner surface of said second cylindrical wall portion and said protuberance forming a tubular open channel for discriminatory auditory communication between said receiver transducer and the auditory canal of the ear of the user, the terminal cross section of said tubular channel being generally sector-shaped with the apex of the sector disposed near said protuberance and near the axis of said cylindrical body, the arc of said sector being disposed contiguously to and substantially concentric with said flange, the magnitude of said arc being in the range of 90 degrees to 120 degrees.

References Cited by the Examiner

UNITED STATES PATENTS

| | | | |
|---|---|---|---|
| 1,368,307 | 2/1921 | Waldron | 179—182 |
| 1,584,662 | 5/1926 | Schulhoff | 179—182 |
| 1,586,140 | 5/1926 | Bonnette | 179—182 |
| 2,353,070 | 7/1944 | Pitkin | 179—156 |
| 2,501,830 | 3/1950 | Ruml | 179—82 |

ROBERT H. ROSE, *Primary Examiner.*

WALTER L. LYNDE, *Examiner.*